United States Patent [19]

Endo

[11] Patent Number: 4,595,795

[45] Date of Patent: Jun. 17, 1986

[54] AUTOMATIC SENSITIVITY SWITCHING CIRCUIT FOR A CORDLESS TELEPHONE

[75] Inventor: Hiroshi Endo, Ichikawa, Japan

[73] Assignee: Uniden Corporation, Ichikawa, Japan

[21] Appl. No.: 631,902

[22] Filed: Jul. 18, 1984

[30] Foreign Application Priority Data

Sep. 2, 1983 [JP] Japan ............................. 58-160497

[51] Int. Cl.⁴ .............................................. H04M 1/02
[52] U.S. Cl. ............................ 179/2 EA; 179/2 BC; 455/73; 455/89; 455/127
[58] Field of Search ........................... 179/2 E-2 EC; 455/73, 89, 254, 343, 232-234

[56] References Cited

U.S. PATENT DOCUMENTS 4,511,761  4/1985  Yamazaki et al. ............... 179/2 EA

*Primary Examiner*—Gene Z. Rubinson
*Assistant Examiner*—Robert G. Lev
*Attorney, Agent, or Firm*—Oblon, Fisher, Spivak, McClelland & Maier

[57] ABSTRACT

An automatically switching circuit for the receiving sensitivity in a cordless telephone comprises a base unit and a portable handset in wireless communication with the base unit, which is responsive to the flow of charging current from the base unit to the portable handset for reducing the gain of an antenna or amplifying stage to a desired low level, thereby preventing erroneous ringing due to surrounding noise signals or disturbances while the portable handset rests on the base unit.

6 Claims, 4 Drawing Figures

AUTOMATIC SENSITIVITY SWITCHING CIRCUIT FOR A CORDLESS TELEPHONE

BACKGROUND OF THE INVENTION:

1. Field of the Invention

This invention relates to an automatically switching circuit for switching the sensitivity with which a call signal is detected in the portable handset of a cordless telephone from a high to low level or vice versa. Specifically, this invention relates to an automatic sensitivity switching circuit capable of setting the sensitivity at a relatively high level in the remote standby situation in which the portable handset is at a distance from the base unit, and of setting the sensitivity at a relatively low level when the portable handset is resting on the base unit.

2. Description of the Prior Art

As is well known, a cordless telephone comprises a base unit connected to the exchange line as is the case with an ordinary automatic telephone body, and a portable handset, which corresponds to the telephone receiver of the ordinary telephone, but can be separated from the base unit for the user to carry and use at a desired place as a wireless telephone receiver.

If the handset is not to be used for a relatively long period, as for instance at night, it rests on the base unit, whereby the input terminals of the handset are brought in contact with the output terminal of the base unit, thereby automatically charging a secondary battery contained in the handset.

In use, the user carries the handset to a desired place remote from the base unit, and then the handset is put in its standby situation in which the handset is ready to detect a call signal from the base unit by wireless connection. With a view to avoiding an undesirable situation of the handset not being able to pick up the call signal from the base unit so that it will not ring, the handset is usually designed to have sufficiently high sensitivity.

The high sensitivity on the side of the hadset is liable to cause erroneous ringing of the handset under the influence of undesired noise signals of radio frequency. Though such erroneous ringing may be permissible in the daytime when the level of ambient noise is high, it cannot be put up with at night after the user or others in the house have gone to bed.

SUMMARY OF THE INVENTION

In view of the above, the object of this invention is to provide a sensitivity switching circuit which is responsive to the separation of a portable handset from an associated base unit for increasing the sensitivity with which the handset can pick up a call signal from the base unit at a distance, and is responsive to the placing of the handset on the base unit for decreasing the sensitivity of the handset.

To attain this object according to this invention a circuit for automatically switching the sensitivity with which the handset of a cordless telephone receives a call signal from a relatively high level to a relatively low level or vice versa is designed to detect an electric current flowing from the base unit to a secondary battery contained in the handset for charging the same with electricity when the handset is placed on the base unit, and is designed to reduce the sensitivity of the handset in response to the detection of the charging current.

A decision as to whether the handset is separated from the base unit or is on the base unit is made in terms of the charging current flowing from the base unit to the secondary battery contained in the handset, and the sensitivity of the handset to call signals from the base unit is reduced by preventing the call signals from entering an associated amplifier or by drastically reducing the gain of the amplifier, thereby preventing any erroneous ringing due to surrounding noise signals or disturbances when the handset is put on the cradle of the base unit.

Even if the sensitivity of the handset is substantially reduced when the handset is on the base unit, the handset is still sensitive enough to catch a call signal because it is at the nearest possible position to the base unit where the handset is most strongly affected by the electric field appearing upon the arrival of the call signal.

A sensitivity switching circuit according to this invention can be incorporated in an existing cordless telephone with only simple modification.

Other objects and advantages of this invention will be understood from the following description of preferred embodiments according to this invention, which are shown in the accompanying drawings.

Figure 1:
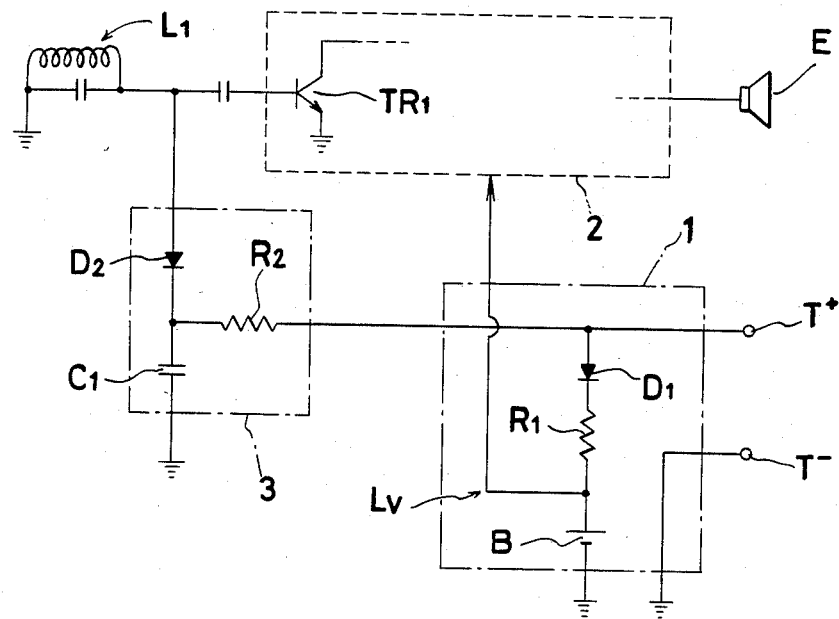
FIG. 1 shows a sensitivity switching circuit according to a first embodiment of this invention.

DESCRIPTION OF THE PREFERRED EMBODIMENTS:

FIG. 1 is a wiring diagram of a sensitivity switching circuit according to the first embodiment of this invention, showing the electric connection of the essential parts in a portable handset. A secondary battery B, a current limiting resistor $R_1$ and a counter flow preventing diode $D_1$ are series-connected to constitute a charging circuit 1. The charging circuit 1 is connected across the input terminal $T^+$ and $T^-$ of the handset, which are adapted to be brought in contact with the output terminals (not shown) of the base unit for charging the secondary battery B.

When a call signal arrives at an antenna coil $L_1$ which constitutes a part of the antenna circuit, the call signal is directed to the transistor $TR_1$ in a high-frequency amplifying stage 2 diagramatically shown in FIG. 1 for driving a sound generating device such as a speaker E. The high-frequency amplifying stage 2 is well known and, therefore, does not require detailed description.

In case that the handset is not to be used for a relatively long time, for instance, at night, the effective sensitivity of the amplifying circuit 2 is reduced to the extent that the handset is insensitive to surrounding noise signals, thereby preventing any erroneous ringing of the telephone.

To attain this effect the first embodiment is constituted as follows:

When the handset is separated from the base unit, the terminals $T^+$ and $T^-$ for use in charging the secondary bettery B are open, and the secondary battery B in the handset supplies electric power as required to the call signal amplifying circuit 2. A receiving sensitivity reducing circuit 3 composed of a switching diode $D_2$, a capacitor $C_1$ and a resistor $R_2$ (encircled with broken line) remains inactive.

When the handset is put on the cradle of the base unit, the charging voltage appearing across the terminals $T^+$ and $T^-$ is applied to a series connection of the diode $D_1$, the current limiting resistance $R_1$ and the secondary battery B, thus causing a charging current to flow in the series connection. At the same time, the diode $D_2$ in the receiving sensitivity reducing circuit 3 is biased forward through the current limiting resistance $R_2$, and then the diode $D_2$ is brought into its conductive condition.

As a result a series connection of the conductive diode $D_2$ and a capacitor $C_1$ is put across the antenna coil $L_1$, thereby short-circuiting the antenna coil $L_1$ in the sense of alternating current to reduce substantially the function of the antenna coil. This effect is equivalent to a reduction of the receiving sensitivity of the handset.

In place of short-circuiting the antenna coil almost completely as in this particular embodiment, a resistance appropriate for controlling the sensitivity of the handset may be put across the antenna coil. Even though the receiving sensitivity of the handset is reduced drastically, the handset resting on the base unit is still sensitive enough to pick up a call signal for ringing the telephone.

Figure 2:
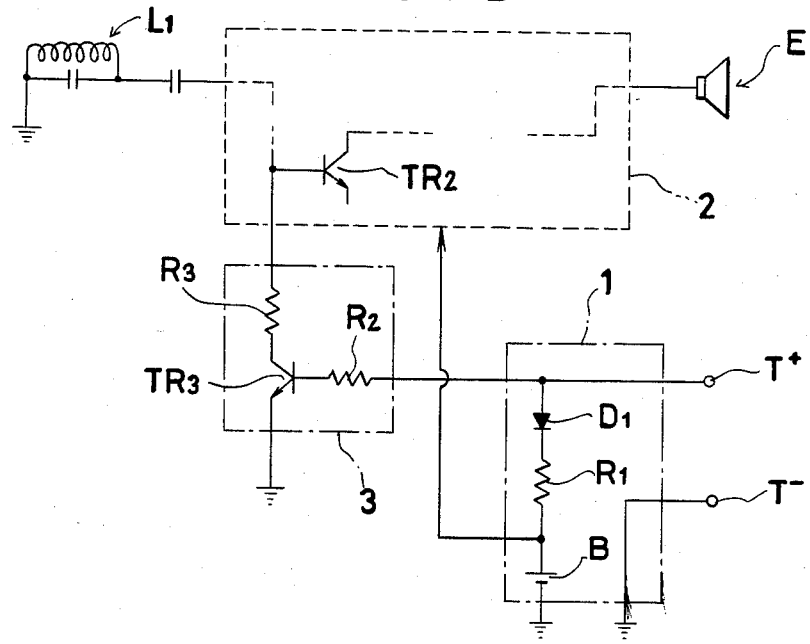
FIG. 2 shows another sensitivity switching circuit according to a second embodiment.

FIG. 2 shows a sensitivity switching circuit according to the second embodiment. In place of substantially reducing the receiving sensitivity of the handset by eliminating the input signal from the input stage of the handset circuit, one of the transistors $TR_2$ in the amplifying stage is designed to be responsive to the placement of the handset on the base unit for cancellation of its amplifying capability, thereby reducing the effective sensitivity of the whole system.

Specifically, among the transistors contained in the high-frequency amplifier stage, the mixing stage, the middle-frequency amplifier stage and the low-frequency amplifier stage, one transistor is selected and is connected to an associated circuit, which is designed to be responsive to the placement of the handset on the base unit for eliminating an input or output signal from the input or output terminal of the selected transistor. Such transistor is indicated at $TR_2$ in FIG. 2. As shown, a series connection of a resistor $R_3$ and a switching transistor $TR_3$ in a receiving sensitivity reducing circuit 3 is connected across the base-to-emitter electrode of the transistor $TR_3$.

With this arrangement, when the handset is put on the base unit to cause a charging voltage to appear across the charging terminals $T^+$ and $T^-$, a base current flows from the terminal $T^+$ to the base electrode of the switching transistor $TR_3$ through the current limiting resistor $R_2$, thereby turning on the switching transistor $TR_3$. As a result the selected transistor $TR_2$ in the signal transmission line is short-circuited at its input side in the sense of alternating current, thereby drastically reducing the gain of the amplifier stage and hence the receiving sensitivity of the handset is reduced to a desired low level.

The resistor $R_3$ in series with the switching transistor $TR_3$ is used for the purpose of controlling the degree to which the selected transistor $TR_2$ is by-passed and hence controlling the effective sensitivity of the whole system.

The switching transistor $TR_3$ may be connected to the output of the selected transistor $TR_2$. The switching transistor $TR_3$ may be used in the same way as the diode $D_2$ in the first embodiment, that is, for the purpose of short-circuiting the antenna coil $L_1$ in response to the placement of the handset on the base unit. In describing the second embodiment of FIG. 2, the same parts as in the first embodiment of FIG. 1 are not described for the sake of simplicity in description. This is the same with the following descriptions of the third and fourth embodiments.

Figure 3:
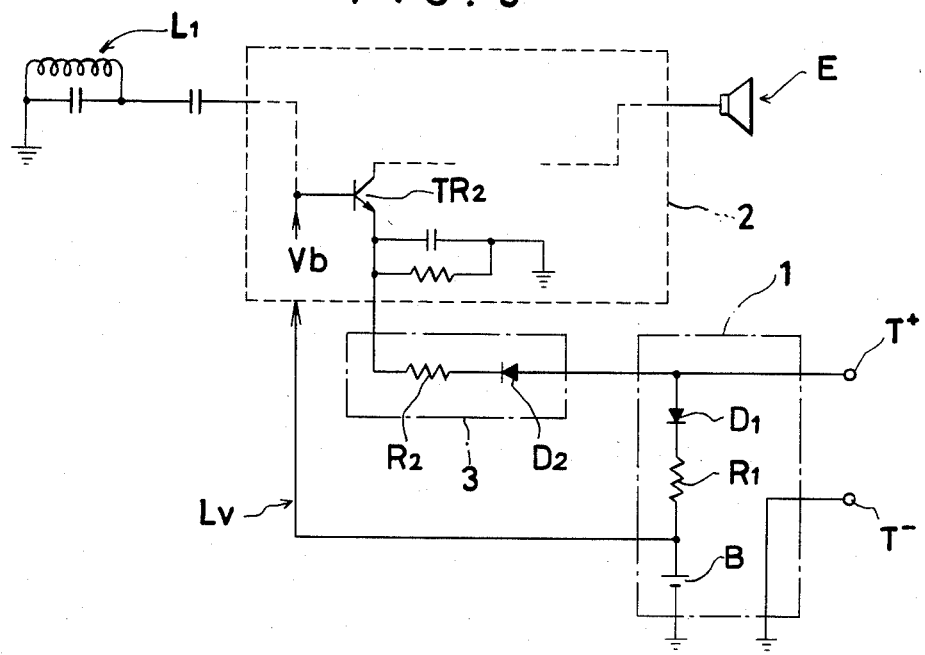
FIG. 3 shows still another sensitivity switching circuit according to a third embodiment.

The circuit structure shown in FIG. 3 is effective for reducing the amplifying function of a selected transistor $TR_2$ in the amplifier stage for amplifying a call signal.

When the handset is put on the base unit, the positive potential appearing at the terminal $T^+$ is applied to the emitter electrode of the transistor $TR_2$ through a switching diode $D_2$ and a resistor $R_2$. If the value of the resistor $R_2$ is so selected that the positive potential applied to the emitter electrode of the transistor $TR_2$ is above the bias voltage $V_b$ applied to the base electrode of the transistor $TR_2$, the transistor $TR_2$ will be brought in or in the vicinity of its "cut-off" condition, thus drastically reducing the gain of the amplifier stage, and hence the sensitivity of the handset.

Figure 4:
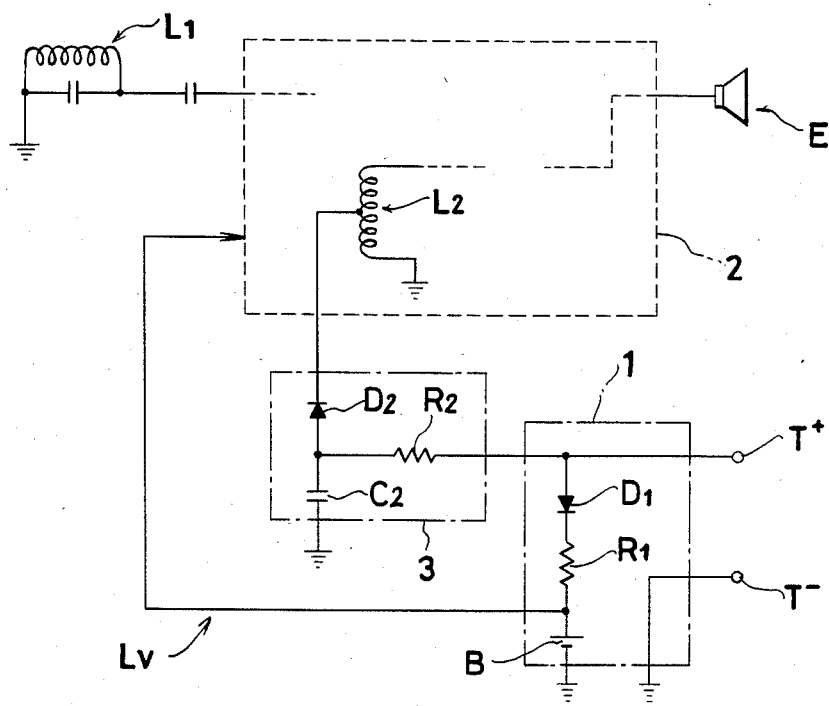
FIG. 4 shows still another sensitivity switching circuit according to a fourth embodiment.

FIG. 4 shows a sensitivity changing circuit according to the fourth embodiment of this invention. The sensitivity changing ciruit is designed so as to short-circuit a coil other than the antenna coil $L_1$, for instance, a resonance coil $L_2$ in a resonant circuit. When the handset is put on the base unit, a charging current flows from the terminal $T^+$ to the secondary battery B through the diode $D_1$ and the resistor $R_1$, and at the same time, the diode $D_2$ is biased forward to turn on. As a result the coil $L_2$ is partially short-circuited by a series connection of the conductive diode $D_2$ and a capacitor $C_1$, thereby drastically deteriorating the function of the coil $L_2$. The degree of deterioration depends on which part of the coil $L_2$ is shunted.

As an alternative to short-circuiting a selected part of the coil $L_2$ in the sense of alternating current, the selected part of the coil $L_2$ may be magnetically saturated in the sense of direct current.

As is apparent from the above, the principle of this invention resides in that the gain of the amplifying stage for amplifying the call signal is reduced to a desired low level in response to the placement of the handset on the base unit, which placement is detected in terms of the charging current flowing from the base unit to the secondary battery contained in the handset. This principle can be applied in a variety of modifications, and therefore this invention should not be understood as being limited to the embodiments described above.

A cordless telephone equipped with a sensitivity switching circuit according to this invention is most advantageous in use. When the user separates the handset from the base unit and carries it to a remote place, the handset is in its standby situation with the highest sensitivity to call signals, and when no calls are expected, for instance, at night, the handset is put on the base unit, which causes the sensitivity of the handset to be reduced to the extent that it is insensitive to surrounding noise signals, thus preventing erroneous ringing which otherwise would often be caused and disturb the user in his sleep. Advantageously only simple and minor modification is required for equipping an existing cordless telephone with a sensitivity switching circuit according to this invention thanks to the principle of this invention according to which a decision as to whether the telephone is not to be used for a relatively long time is made in terms of the charging current flowing to the secondary battery contained in the handset.

What is claimed is:

1. An automatic sensitivity switching circuit for use in a cordless telephone comprising a base unit and a portable handset in wireless connection with the base unit, said portable handset including a charging circuit which has a secondary battery, and is responsive to the placement of the handset on the base unit for charging the secondary battery, a call signal amplifying circuit which is adapted to receive signals from the base unit by means of an antenna and supplied with electric power from the secondary battery in said charging circuit, which automatic sensitivity switching circuit comprises a switching element for turning itself on in response to a charging current fed from the base unit to the secondary battery of the handset so as to substantially lower the sensitivity of the call signal amplifying circuit.

2. An automatic sensitivity switching circuit according to claim 1 wherein the antenna circuit is supplied with a part of the charging current flowing into said secondary battery when the switching element is operated to close.

3. An automatic sensitivity switching circuit according to claim 2 wherein the switching element comprises a diode.

4. An automatic sensitivity switching circuit according to claim 1 wherein the call signal amplifying circuit is supplied with a part of the charging current flowing into said secondary battery when the switching element is operated to reduce the gain of the amplifier to a desired low level.

5. An automatic sensitivity switching circuit according to claim 4 wherein a selected transistor in the call signal amplifying circuit is supplied with a part of the charging current flowing into said secondary battery when the switching element is operated for depriving the selected transistory of its amplifying function.

6. An automatic sensitivity switching circuit according to claim 1 wherein a resonance coil in the call signal amplifying circuit is supplied with a part of the charging current flowing into said secondary battery when the switching element is operated.

* * * * *